United States Patent [19]

Nakamura et al.

[11] Patent Number: 5,348,700
[45] Date of Patent: Sep. 20, 1994

[54] POLYESTER FLAT AND SPLIT YARN

[75] Inventors: Akira Nakamura; Ryosuke Kamei; Takeshi Takahashi; Tetuya Takahashi; Shigenori Terazono, all of Kawasaki; Eiichiro Takiyama, Kamakura, all of Japan

[73] Assignee: Showa Highpolymer Co., Ltd., Tokyo, Japan

[21] Appl. No.: 48,182

[22] Filed: Apr. 20, 1993

[30] Foreign Application Priority Data

May 12, 1992 [JP] Japan ................. 4-119199
May 13, 1992 [JP] Japan ................. 4-120783

[51] Int. Cl.$^5$ ............................................. B29C 47/00
[52] U.S. Cl. ................................ 264/177.17; 528/272; 528/288; 528/296; 528/302; 528/307; 528/350; 528/353; 525/437; 525/440; 264/177.1; 264/210.7
[58] Field of Search ............. 528/272, 272.1, 288, 528/296, 302, 350, 353, 226, 307; 525/437, 440; 264/177.1, 117.17, 210.7

[56] References Cited

U.S. PATENT DOCUMENTS

| | | | |
|---|---|---|---|
| 2,999,851 | 9/1961 | Elmer | 528/83 |
| 4,041,208 | 8/1977 | Seeger et al. | 428/424 |
| 4,057,537 | 11/1977 | Sinclair | 528/354 |
| 4,076,798 | 2/1978 | Casey et al. | 514/772.3 |
| 4,166,873 | 9/1979 | Gilliam | 428/35 |
| 5,068,143 | 11/1991 | Agger et al. | 428/241 |

FOREIGN PATENT DOCUMENTS

| | | |
|---|---|---|
| 0323700 | 7/1989 | European Pat. Off. |
| 0393819 | 10/1990 | European Pat. Off. |
| 0448294 | 9/1991 | |
| 869243 | 1/1942 | France . |
| 1059075 | 3/1954 | France . |
| 748872 | 5/1956 | United Kingdom . |

Primary Examiner—Samuel A. Acquah
Attorney, Agent, or Firm—Sughrue, Mion, Zinn, Macpeak & Seas

[57] ABSTRACT

Flat and split yarn formed by extrusion molding, comprising as a main component an aliphatic polyester having a melt viscosity of $2.0 \times 10^3 - 4.0 \times 10^4$ poises at a temperature of 190° C. and a shear rate of 100 sec$^{-1}$, and having a melting point of 70°–190° C. The present invention provides flat and split yarn having excellent in heat stability and mechanical strength as well as having biodegradability.

7 Claims, No Drawings

POLYESTER FLAT AND SPLIT YARN

BACKGROUND OF THE INVENTION

1. Field of the Invention

The present invention relates to flat and split yarn having excellent heat stability and mechanical strength, such as tensile strength, knot strength which are prepared by using aliphatic polyesters with biodegradability and sufficiently high molecular weights and specific melt properties for practical use.

2. Discussion of the Background

In recent years, plastics have been increasingly used as packing materials, and as agricultural, fishery and forestry industrial materials and the like, all of which are required to have corrosion resistance, weathering resistance, wear resistance, high strength and the like. On the other hand, the waste from the large amounts of plastics used as the above materials has the possibility of polluting rivers, oceans and soil, and cause a great social problem. The appearance of plastics having biodegradability is thus eagerly awaited in order %o prevent such pollution. For example, poly(3-hydroxybutylate) produced by fermentation methods using microorganisms, blends of general-purpose plastics and starch, a naturally occurring polymer, and the like are already known. The former polymer has a drawback in that it is poor in molding properties because the polymer has a heat decomposition temperature close to its melting point and a raw material efficiency is very bad because it is produced by microorganisms. On the other hand, since the naturally occurring polymer of the latter does not by itself have thermoplasticity, the polymer has defects in molding properties, and is greatly limited in its range of application.

On the other hand, although it is known that aliphatic polyesters are biodegradable, they have hardly been used because polymeric material sufficient enough to obtain practical molded product cannot be obtained. Recently, it has been found that a ring-opening polymerization of ε-caprolactone produces a higher molecular weight polymer, and proposed to use the polymer as a biodegradable resin. However, the resulting polymer is limited to only special applications because of a low melting point of 62° C. and a high cost thereof. Further, although glycolic acid, lactic acid and the like are polymerized by a ring-opening polymerization of glycolide and lactide thereof to obtain polymers with higher molecular weights so as to be sometimes used as medical fibers and the like, the polymers are not used in great amounts as industrial parts, automotive members, domestic articles and the like because their decomposition temperatures are close to their melting point and they have defects in their molding properties.

Flat yarns and fabrics thereof as one of packaging materials and agricultural materials required to have corrosion resistance, high strength and the like mainly consist of a high density polyethylene resin and polypropylene resin from among the polyolefins. The flat yarn is used as tying string and bands and cloth formed by weaving the yarn is useful as a curing sheet, civil engineering sheet, rice and wheat bags, cement bags, packing material such as flexible containers or the like, and as primary base cloth for carpet. Polyethylene terephthalate, polypropylene terephthalate and the like are not used for producing the flat yarn because of unstable winding and yarn separation when forming, and large deterioration rate thereof.

Further, it is no exaggeration to say that polymeric polyesters (referring to polymeric polyesters having number-average molecular weights of at least 10,000) generally used for forming of the yarn which is used one of the packing materials and agricultural, fishery and forestry industrial materials are limited to polyethylene terephthalate, a condensate of terephthalic acid (including dimethyl terephthalate) and ethylene glycol. Although there are cases of 2,6-naphthalenedicarboxylic acid being used instead of terephthalic acid, there are no reports of trials which resulted in providing the obtained polymers with biodegradability.

Therefore, it is safe to say that there has been no concept of trying to make the molding of flat and split yarn using biodegradable aliphatic polyesters in which aliphatic dicarboxylic acid was used practical.

One of the reasons why this application concept has not been thought of is felt to be that in spite of the required special molding conditions and physical properties for the above flat and split yarn, most of the above-mentioned aliphatic polyesters have melting points of 100° C. or lower even if they are crystalline, and have poor heat stability when melted above that. Of further importance is that the properties, particularly mechanical properties such as tensile strength, of these aliphatic polyesters show markedly poor values even when they are the same level of number-average molecular weight as the above-mentioned polyethylene terephthalete, so just conceiving that the molded articles having required strength and the like would be obtained was difficult.

Another reason seems to be that studies for improving the physical properties of the aliphatic polyesters by increasing their number-average molecular weights were not make sufficiently advanced because of their poor heat stability.

The object of the present invention is to provide flat and split yarn prepared by using the above-mentioned aliphatic polyesters as their components which have sufficient high molecular weights for practical use, have excellent mechanical properties represented by heat stability and tensile strength, and which may be decomposed by microorganisms and the like, i.e., are biodegradable as one means of waste disposal so that they may be easily disposed of after the use thereof.

SUMMARY OF THE INVENTION

As a result of various studies of the reaction conditions for obtaining polyesters having sufficient high molecular weight for practical use and molding properties suitable for flat and split yarn, the present inventors have obtained specific aliphatic polyesters that maintain biodegradability while having sufficient high molecular weights for practical use, then have found that flat yarn produced from the polyester has superior tensile strength, knot strength and resistivity to yarn separation, and split yarn produced from the polyester has heat stability and mechanical strength, both of them having the above-mentioned biodegradability to achieve the present invention.

That is, the present invention provides: (A) flat and split yarn mainly consisting of an aliphatic polyester having a melt viscosity of $2.0 \times 10^3$–$4.0 \times 10^4$ poises at a temperature of 190° C. and a shear rate of 100 sec$^{-1}$, and having a melt temperature of 70°–190° C.; (B) flat and split yarn according to (A) in which the number-average molecular weight of the aliphatic polyester is at least 10,000 and includes 0.03–3% by weight of urethane bonds; (C) flat and split yarn according to (A) or (B) consisting of an aliphatic polyester obtained by reacting 0.1–5 parts by weight of diisocyanate with 100 parts by weight of an aliphatic polyester prepolymer having a number-average molecular weight of at least 5,000 and a melting point of at least 60° C.

Further, the present invention provides a method for producing a flat yarn by extruding an aliphatic polyester to make film and stretching it, wherein the polyester having a melt viscosity of $2.0\times10^3$–$4.0\times10^4$ poises at 190° C. and under a shear rate of 100 sec$^{-1}$ and melting point of 70°–90° C.

Still further, the present invention provides a method for producing split yarn by extruding an aliphatic polyester to make film, stretching it and splitting it, wherein the polyester having a melt viscosity of $2.0\times10^3$–$4.0\times10^4$ poises at 190° C. and under a shear rate of 100 sec$^{-1}$ and melting point of 70°–90° C.

DETAILED DESCRIPTION OF THE INVENTION

The present invention will be described below in further detail.

The aliphatic polyester of the present invention mainly consists of a polyester obtained by reacting two components of glycols and dicarboxylic acid (or acid anhydrides thereof), and if necessary as a third component, with at least one polyfunctional component selected from the group consisting of trifunctional or tetrafunctional polyols, oxycarboxylic acids, and polybasic carboxylic acids (or acid anhydrides thereof). The aliphatic polyesters are prepared by reacting relatively high molecular weight polyester prepolymers which have hydroxyl groups at ends with a coupling agent so as to make them even higher molecular weight polymer.

It has been known to obtain polyurethane by reacting a low molecular weight polyester prepolymer having a number-average molecular weight of 2,000–2,500, which have hydroxyl groups as the terminal groups, with diisocyanate as a coupling agent in the preparation of rubbers, foams, coatings and adhesives.

However, the polyester prepolymers used in these polyurethane foams, coatings and adhesives are prepolymers having a low molecular weight and a number-average molecular weight of 2,000–2,500 which is the maximum that can be prepared by non-catalytic reaction. To obtain practical physical properties as the polyurethane, it is necessary that the content of diisocyanate should be as much as 10–20 parts by weight in relation to 100 parts by weight of this low molecular weight prepolymer. When such a large amount of diisocyanate is added to the low molecular weight polyester melted at 150° C. or higher, gelation occurs so that no normal resins which can be molded in the form of a melt can be obtained.

Therefore, polyesters which are obtained by reacting a large amount of diisocyanate with a low molecular weight polyester prepolymers as a raw material cannot be used as the raw material for the flat and split yarn of the present invention.

Also, as shown in the case of polyurethane rubbers, although a method is conceivable in which hydroxyl groups are converted into isocyanate groups by the addition of diisocyanate, and then the number-average molecular weight thereof is further increased by using glycols, the same problem as mentioned above arises because 10 parts by weight of diisocyanate relative to 100 parts by weight of the prepolymer should be used in order to obtain practical physical properties.

When a relatively high molecular weight polyester prepolymer is to be used, heavy metal catalysts required to prepare the prepolymer would promote the reactivity of the above-mentioned isocyanate groups to undesirably cause poor preservativity, generation of crosslinking and branching; hence a number-average molecular weight of not more than around 2,500 of polyester prepolymers would be the limit if they were to be prepared without catalysts.

The polyester prepolymers to obtain the aliphatic polyesters used in the present invention are relatively high molecular weight saturated aliphatic polyesters having substantially hydroxyl groups at the ends thereof, number-average molecular weights of at least 5,000, preferably at least 10,000, and melting point of 60° C. or higher, which are obtained by reacting glycols and dibasic carboxylic acids (or acid anhydrides thereof) in the presence of catalysts. When a prepolymer having a number-average molecular weight of lower than 5000 is used, the small amounts of 0.1–5 parts by weight of coupling agents used in the present invention cannot provide flat and split yarn polyesters having good physical properties. When polyester prepolymers having a number-average molecular weight of 5,000 or higher is used, with a hydroxyl value of 30 or less, the use of small amounts of coupling agents even under severe conditions such as a molten state and the like can produce high molecular weight polyesters, without gelation as the reaction is not affected by remaining catalysts.

Therefore, the polymer for the flat and split yarn of the present invention has a repeated chain structure in which a polyester prepolymer having a number-average molecular weight of 5,000 or more, preferably 10,000 or more and consisting of an aliphatic glycol and aliphatic dicarboxylic acid, is combined through the urethane bond derived from, for example, diisocyanate as a coupling agent.

Further, the polymer for the flat and split yarn of the present invention has a repeated chain structure in which the above-mentioned polyester prepolymer provided with branched long chains derived from polyfunctional components is combined through the urethane bond derived from, for example, diisocyanate as a coupling agent. When oxazoline, epoxy compounds, and acid anhydrides are used as a coupling agent, the polyester prepolymer has a repeated chain structure through the ester bond.

The flat and split yarn of the present invention consisting of an aliphatic polyester having a melt viscosity of $2.0\times10^3$–$4.0\times10^4$ poises at a temperature of 190° C. at a shear rate of 100 sec$^{-1}$ and a melt temperature of 70°–190° C., particularly the flat and split yarn of the present invention which essentially consists of an aliphatic polyester obtained by reacting 0.1–5 parts by weight of diisocyanate with 100 parts by weight of an aliphatic polyester prepolymer having a number-average molecular weight of 5,000 or higher and a melting point of 60° C. or higher has biodegradability when buried in the earth; and generates lower heat of combustion than polyethylene and polypropyrene even when thermally disposed of.

The flat yarn of the present invention has excellent tensile strength, knot strength and resistance to yarn separation. That is, the tensile strength is at least 2.0 g/d and the knot strength is at least 1 g/d. The flat yarn can be used as tying strings and bands, and cloth formed by weaving the yarn is useful as a curing sheet, civil engineering sheets, rice and wheat bags, cement bags, packing materials such as flexible containers or the like, and as primary base cloth for carpet. A net formed by knitting is also useful as frost shield nets or light shield nets.

Further, the split yarn of the present invention has excellent thermal stability and mechanical strength, and is thus useful as a split yarn for ropes, nets and the like for packing, agriculture, fishery and forestry.

Examples of glycols which can be used as a reaction component include aliphatic glycols. Among them those having a straight chain alkylene group with even number carbon atoms of 2, 4, 6, 8 and 10 such as: ethylene glycol, 1,4-butanediol, 1,6-hexanediol, 1,8-octanediol, 1,10-decanediol, and mixtures thereof are preferable.

Of these glycols, those having a smaller number of carbon atoms, such as ethylene glycol, 1,4-butanediol and 1,6-hexanediol, are preferable because they can produce an aliphatic polyester having a high crystalinity and a high melting point. In particular, ethylene glycol and 1,4-butanediol are most suitable because they produce good results.

Examples of aliphatic dicarboxylic acids or anhydrides thereof which provide aliphatic polyester by reacting with glycols include aliphatic dicarboxylic acids. Among them those having a straight chain alkylene group with even number carbon atoms of 2, 4, 6, 8 and 10 such as: succinic acid, adipic acid, suberic acid, sebacic acid, 1,10-decanedicarboxylic acid, succinic anhydride and mixtures thereof are preferable. Of these dicarboxylic acids, those having a smaller number of carbon atoms, such as succinic acid, adipic acid and succinic anhydride, are preferable because they can produce an aliphatic polyester having high crystalinity and high melting points. In particular, succinic acid, succinic anhydride and an acid mixture of succinic acid or succinic anhydride and another dicarboxylic acid such as adipic acid, suberic acid, sebacic acid or 1,10-decanedicarboxylic acid are preferable.

In the system of an acid mixture containing two or more acid components, for example, succinic acid and other dicarboxylic acids, the mixing ratio of succinic acid is at least 70 mol %, preferably at least 90 mol %, and the mixing ratio of the other carboxylic acids is 30 mol % or less, preferably 10 mol % or less.

A combination of 1,4-butanediol and succinic acid or succinic anhydride and a combination of ethylene glycol and succinic acid or succinic anhydride are particularly preferable for the present invention because the combinations exhibit melting points close to that of polyethylene.

Third component

To these glycols and dicarboxylic acid, if necessary, may be added as a third component at least one polyfunctional component selected from the group consisting of trifunctional or tetrafunctional polyols, oxycarboxylic acid, and polybasic carboxylic acids (or acid anhydrides thereof). The addition of this third component, which causes the branching of long chains, can impart desirable properties in molten state to the polyester prepolymer, because the ratio of weight-average molecular weight (MW)/ number-average molecular weight (Mn), i.e., the molecular weight distribution, increases with increases in its molecular weight.

In terms of the amount of polyfunctional components to be added without fear of gelation, a trifunctional component of 0.1–5 mole %, or a tetrafunctional component of 0.1–3 mole % is added relative to 100 mole % of the total of aliphatic dicarboxylic acid (or acid anhydride thereof) components.

Polyfunctional components

Examples of polyfunctional components as the third component include trifunctional or tetrafunctional polyols, oxycarboxylic acids, and polybasic-carboxylic acids.

The trifunctional polyols representatively include trimethylol propane, glycerin or anhydrides thereof. The tetrafunctional polyols representatively include pentaerythritol.

The trifunctional oxycarboxylic acid components are divided into the two types of (i) a component which has two carboxyl groups and one hydroxyl group in one molecule, and (ii) another component which has one carboxyl group and two hydroxyl groups in one molecule. Malic acid which has two carboxyl groups and one hydroxyl group in one molecule becomes practical and sufficient to the purposes of the present invention in view of commercial availability at low cost.

The tetrafunctional oxycarboxylic acid components are the following three types of components:
(i) A component which has three carboxyl groups and one hydroxyl group in one molecule;
(ii) Another component which has two carboxyl groups and two hydroxyl group in one molecule; and
(iii) The remaining component which has three hydroxyl groups and one carboxyl group in one molecule. Any type can be used, though in view of commercial availability at low cost, citric acid and tartaric acid are practical and sufficient to the purposes of the present invention.

As a trifunctional polybasic carboxylic acid (or acid anhydride thereof component trimesic acid, propane tricarboxylic acid and the like can be used. Among them, trimesic anhydride is practical for the purposes of the present invention.

As a tetrafunctional polybasic carboxylic acid (or anhydride thereof) various types of aliphatic compounds, cycloaliphatic compounds, aromatic compounds and the like, described in certain literatures, can be used. In view of commercial availability, for example, pyromellitic anhydride, benzophenone tetracarboxylic anhydride and cyclopentane tetracarboxylic anhydride are practical and sufficient to the purposes of the present invention.

These glycols and dibasic acids are mainly consisted of aliphatic series, while small amounts of other components, for example, aromatic series may be concomitantly used. These other components may be blended or copolymerized in amounts up to 20% by weight, preferably up to 10% by weight, and more preferably up to 5% by weight because using these compounds degrades biodegradability.

The polyester prepolymer for aliphatic polyesters to be used in the present invention has hydroxyl groups at the terminals. To introduce the hydroxyl groups, it is necessary that glycols are used somewhat excessively.

For preparation of the polyester prepolymer having a relatively high molecular weight, it is necessary to use deglycol-reaction catalysts in the deglycol reaction subsequent to the esterification.

Examples of the deglycol-reaction catalysts include titanium compounds such as acetoacetoyl type titanium chelate compounds and organic alkoxy titanium compounds and the like. These titanium compounds can be used in combination. Examples of compounds used in combination include diacetoacetoxy oxytitanium (Nippon Chemical Industry Co., Ltd.; Nursem Titanium) tetraethoxy titanium, tetrapropoxy titanium, tetrabutoxy titanium and the like. The amount of the titanium compound used is 0.001–1 part by weight, and preferably 0.01–0.1 part by weight relative to 100 parts by weight of the polyester prepolymer. These titanium compounds may be blended before the esterification, or may be blended immediately before the deglycol-reaction.

To the polyester prepolymer which has a number-average molecular weight of at least 5,000, preferably at least 10,000, and whose terminal groups are substantially hydroxyl groups are added coupling agents in order to increase its number-average molecular weight.

Examples of the coupling agents include diisocyanate, oxazoline, diepoxy compounds, acid anhydrides and the like. Diisocyanate is particularly preferred.

In the cases of oxazoline and diepoxy compounds, it is necessary that the terminal hydroxyl groups are reacted with acid anhydrides and the like to convert them into carboxyl groups, then coupling agents are used.

Although not limited, examples of diisocyanate include 2,4-tolylene diisocyanate a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, isophorone diisocyanate and the like. Particularly, hexamethylene diisocyanate is preferably used in terms of hue of prepared resins, reactivity at the time of blending polyesters, and the like.

The adding amounts of these coupling agents are 0.1–5 parts by weight, and preferably 0.5–3 parts by weight relative to 100 parts by weight of polyester prepolymer. Addition of less than 0.1 part by weight causes insufficient coupling reaction, whereas with more than 5 parts by weight gelation tends to occur.

The addition is preferably performed when the polyester is in a uniformly melted state under easily stirtable conditions. Although it is not impossible for the coupling agents to be added to the polyester prepolymer in the solid sate and melted and mixed through an extruder, adding the agents in a polyester preparation unit, or adding them to polyester prepolymer in a melt state (for example, in a kneader) is more practical.

The aliphatic polyester to be used in the present invention is required to have selected melt properties for the flat and split yarn formed by extrusion molding. That is, the aliphatic polyester to be used in the present invention needs to have a melt viscosity of $2.0 \times 10^3$–$4.0 \times 10^4$ poises, preferably $3.0 \times 10^3$–$3.0 \times 10^4$ poises and more preferably $5.0 \times 10^3$–$2.0 \times 10^4$ poises and most preferably $1.0 \times 10^4$–$2.0 \times 10^4$ poises at a temperature of 190° C. at a shear rate of 100 sec$^{-1}$.

With less than $2.0 \times 10^3$ poise, since a base film become greatly uneven in thickness during melt extrusion, it is difficult to wind the film stably, and satisfactory physical properties cannot be obtained even if the film can be wound. With more than $4.0 \times 10^4$ poises, since melt fracture occurs, the film becomes uneven, or the film cannot be easily stretched during melt extrusion, or the stretch ratio obtained is low.

The melt viscosity at a shear rate of 100 sec$^{-1}$ was calculated from a graph which shows the relation between the apparent viscosities and shear rates measured using a nozzle having a diameter of 1.0 mm and L/D of 10 at a resin temperature of 190° C.

The melting point of the aliphatic polyester to be used in the present invention needs to be 70°–190° C. preferably 70°–150° C., and more preferably 80°–135° C. A melting point of less than 70° C. will give flat and split yarn poor heat resistance to distort them, whereas with higher than 190° C. make it is difficult to produce flat and split yarn.

To achieve a melting point higher than 70° C. the polyester prepolymer need to have a melting point of at least 60° C.

The amount of urethane bonds contained in the aliphatic polyester of the present invention is 0.03–3.0% by weight, preferably 0.05–2.0% by weight, and more preferably 0.1–1.0% by weight.

The amount of urethane bonds is measured by $^{13}$C NMR, showing good correlation with the charged amount.

Less than 0.03% by weight of urethane bonds has a little effect on polymerization and leads to poor molding properties, whereas more than 3% by weight causes gelation.

It is needless to say that when the above-mentioned aliphatic polyester is used to obtain the flat and split yarn according to the present invention, if necessary, lubricants, waxes and coloring agents crystallizing promoters as well as antioxidants, heat stabilizers, UV absorbers and the like can be used concomitantly.

That is, antioxidants include hindered phenol antioxidants such as p-tert-butyl hydroxytoluene and p-tert-butyl hydroxyanisole, sulfur antioxidants such as distearyl thiodipropionate and dilauryl thiodipropionate, and the like; heat stabilizers include triphenyl phosphite, trilauryl phosphite, trisnonylphenyl phosphite and the like; UV absorbers include p-tert-butyl phenyl salicylate, 2-hydroxy-4-methoxybenzophenone, 2-hydroxy-4-methoxy-2'-carboxybenzophenone, 2,4,5-trihydroxybutylophenone and the like; lubricants include calcium stearate, zinc stearate, barium stearate, sodium palmirate and the like; antistatic agents include N,N-bis(hydroxyethyl) alkyl amine, alkyl amine, alkyl allyl sulfonate, alkyl sulfonate and the like; flame retarders include hexabromocyclododecane, tris-(2,3-dicyclopropyl) phosphate, pentabromophenyl allyl ether and the like; inorganic fillers include calcium carbonate, silica, titanium oxide, talc, mica, barium sulfate, alumina and the like; crystallizing promoters include polyethylene terephthalate, poly-trans-cyclohexane dimethanol terephthalate and the like. (The method for producing the flat yarn)

The raw material used in the present invention comprising as a main component an aliphatic polyester can be melted and extruded by a known molding machine using a circular die, a T-die or the like. The extrusion temperature is generally 120°–260° C., preferably 170° C. to 230° C., more preferably 180° C. to 210° C. At higher than 260° C., film swings largely to make the forming unstable. And at higher than 230° C., gelation takes place and causes non-stretching and generation of fish eyes. The raw material is melted and extruded to form a film, and the resultant film is hardened by cooling, slit in a ribbon-like shape, stretched and then subjected to relaxation heat treatment. In melt extrusion, a multi-layer flat yarn can be formed by laminating co-extrusion of two or three layers of the polyester and other resins in order to improve the physical properties of the flat yarn. A ribbed flat yarn can also be formed by using ribbed die lips. A conventional wet or dry extrusion process, i.e., an in-bath, steam heated roll or oven heating plate process, can be employed for stretching at a high temperature with a total stretch ratio of 3 to 9 times, preferably 4 to 8 times. Since the raw material comprising as a main component an aliphatic polyester according to the present invention has high dependency of its strength to the stretch ratio, the strength can easily be adjusted by the stretch ratio. Two-step stretching is more preferred than one-step stretching. The polymer used in the present invention can be cold-stretched. In the first step of two-step stretching, the temperature is 40° C. to 110° C., preferably 60° C. to 90° C., and the stretch ratio is within the range of from 30% to 90%, preferably 60% to 85%, of the total ratio. In the second step, the temperature is 80° C. to 120° C., preferably 90° C. to 100° C., and the stretch ratio is within the range of from 70% to 10%, preferably 40% to 15%, of the total ratio. If the temperature in the first step is 40° C. or less, although stretching can be made, resistivity to yarn separation deteriorates, and the yarn is easily split and broken. In other words, the textile formed significantly deteriorates. At higher than 110° C., the film is not oriented. The relaxation heat treatment is preferably effected at 90° C. to 140° C., more preferably 110° C. to 150° C. The relaxation rate is preferably 5% to 30%, more preferably 10% to 20%. If the relaxation heat treatment temperature is less than 90° C. or if the relaxation rate is less than 5%, the rate of aging contraction of the flat yarn increases. Conversely, if the relaxation heat treatment temperature exceeds 140° C. or if the relaxation rate exceeds 30%, the yarn has a wavy shape and thus shows poor winding appearance.

The method for producing the split yarn

The split yarn according to the present invention may be produced by subjecting the above flat yarn to a split roll. A razor blade, a needle blade, a round saw tooth blade or the like may be used as a blade for the split roll. In the present invention, the method of production of the split yarn from the flat yarn is not limited.

If the aliphatic polyester used in the present invention has a number-average molecular weight of at least 10,000, preferably at least 20,000, and contains very small amounts of bonds formed by a coupling agent. If the aliphatic polyester has a melting point of 70° to 190° C. and crystallinity, strong flat and split yarns can be formed. The flat yarn obtained can be used for packing materials such as tying string and the like, agricultural materials and various fabrics. Further, the split yarn obtained can be used as twisted yarns (twine) for ropes, nets and the like for packing, agriculture, fishery and forestry use.

EXAMPLES

The present invention will be illustrated with reference to the following Examples and Comparative Examples but the invention is not intended to be limited only thereto.

Example 1

A 700 L reactor was purged with nitrogen, then 183 kg of 1,4-butanediol and 224 kg of succinic acid were charged in it. After the temperature was elevated under nitrogen stream, esterification by dehydration condensation was carried out for 3.5 hr at 192°–210° C., and after ceasing nitrogen charge, for further 3.5 hr under reduced pressures of 20–2 mmHg. A sample collected had an acid value of 9.2 mg/g, a number-average molecular weight (Mn) of 5,160 and a weight average molecular weight (Mw) of 10,670. Subsequently, 34 g of tetraisopropoxy titanium, a catalyst, was added at normal pressures under nitrogen stream. The temperature was elevated to carry out a deglycol-reaction at temperatures of 215°–220° C. under reduced pressures of 15–0.2 mmHg for 5.5 hr. A sample collected had a number-average molecular weight (Mn) of 16,800 and a weight average molecular weight (Mw) of 43,600. The yield of resulting polyester prepolymer (A1) was 339 kg except condensate water.

5.42 kg of hexamethylene diisocyanate was added to the reactor containing 339 kg of the polyester prepolymer (A1) to perform a coupling reaction for 1 hr at 180°–190° C. The viscosity was rapidly increased, but no gelation occurred. Then, 1.70 kg of Irganox 1010 (Ciba-geigy) as an antioxidant and 1.70 kg of calcium stearate as a lubricant were added, and the mixture was further stirred for 30 min. The resulting reaction product was extruded into water, and cut by a cutter into pellets. The aliphatic polyester (B1) obtained after drying in a vacuum at 90° C. for 6 hr had a yield of 300 kg.

The obtained polyester (B1) was a slightly ivory-like white, waxy crystal, and had a melting point of 110° C., a number-average molecular weight (Mn) of 35,500 a weight-average molecular weight (Mw) of 170,000, a MFR (190° C.) of 1.0 g/10 min, a viscosity of 230 poises in a 10% ortho-chlorophenol solution and a melt viscosity of $1.5 \times 10^4$ poises at a temperature of 190° C. at a shear rate of 100 $\sec^{-1}$. The average molecular weight was measured by a Shodex GPC System-11 (Showa Denko, gel permiation chromatography) using a HFIPA solution containing 5 mmol CF, COONa (concentration of 0.1% by weight) as a medium. A calibration curve was drawn using a PMMA standard sample (Shodex Standard M-75, Showa Denko).

After the polyester (B1) was dried by a dew-point control type circulating hot air dryer at 120° C. for 2 hours, the polyester was melted and extruded through a 90 mm$\phi$ extruder with a T-die having a die width of 1200 m/m width and a lip gap of 0.7 m/m, and was hardened by cooling with a water-cooled chill roll to form a raw sheet. The thus-formed raw sheet was slit into widths of 7 m/m, stretched in two steps using a heating plate and was subjected to relaxation heat treatment using a heating plate. Stretching was performed in the first and second steps with a stretch ratio of 80% and 20%, respectively, of the total ratio of 4.5 times, at temperatures of 70° C. and 90° C., respectively. The relaxation temperature was 120° C., the relaxation rate was 10%, and the stretching speed was 80 m/min. As a result, a flat yarn of 1000 denier having a width of 3 m/m was produced. The flat yarn obtained exhibited physical properties such as a tensile strength of 5.3 g/d and a knot strength of 3.0 g/d and sufficient practicability. When the flat yarns were buried in the ground for 5 months, about half of the yarns were degraded.

The production conditions, appearance evaluation and the resulting physical properties of the flat yarn obtained are summarized in Table 1.

The physical properties such as tensile strength and the like were measured in accordance with the measurement method of JIS Z1533.

Examples 2 and 3

A flat yarn was produced under the same conditions as employed in Example 1 except that the yarn width and denier were changed. The appearance evaluation and resulting physical properties of the flat yarn are shown in Table 1.

When the flat yarn obtained was buried in the ground for 5 months, the flat yarn was degraded to a level having no practical strength Example 4

A 700 L reactor was purged with nitrogen, then 177 kg of 1,4-butanediol, 198 kg of succinic acid and 25 kg of adipic acid were charged in it. After the temperature was elevated under nitrogen stream, esterification by dehydration condensation was performed for 3.5 hr at 190°–210° C., and after ceasing nitrogen charge, for further 3.5 hr under reduced pressures of 20–2 mmHg. A sample collected had an acid value of 9.6 mg/g, a number-average molecular weight (Mn) of 6,100 and weight-average molecular weight (Mw) of 12,200. Subsequently, 20 g of tetraisopropoxy titanium, a catalyst, was added at normal pressures under nitrogen stream. The temperature was elevated to perform a deglycol-reaction at temperatures of 210°–220° C. under reduced pressures of 15–0.2 mmHg for 6.5 hr. A sample collected had a number-average molecular weight (Mn) of 17,300 and a weight-average molecular weight (Mw) of 46,400. The resulting polyester (A2) had a yield of 337 kg except condensate water.

4.66 kg of hexamethylene diisocyanate was added to the reactor containing 333 kg of polyester (A2) to perform a coupling reaction for 1 hr at 180°–190° C. The viscosity was rapidly increased, but no gelation occurred. Then, 1.70 kg of Irganox 1010 (Ciba-Geigy) as an antioxidant and 1.70 kg of calcium stearate as a lubricant were added, and the mixture was further stirred for 30 min. The resulting reaction product was extruded into water by an extruder, and cut by a cutter into pellets. The aliphatic polyester (B2) obtained after drying in a vacuum at 90° C. for 6 hr had a yield of 300 kg.

The obtained polyester (B2) was a slightly ivory-like white, waxy crystal, and had a melting point of 103° C., a number-average molecular weight (Mn) of 36,000, a weight-average molecular weight (Mw) of 200,900, a MFR (190° C.) of 0.52 g/10 min, a viscosity of 680 poises in a 10% orthochlorophenol solution and a melt viscosity of $2.2 \times 10^4$ poises at a temperature of 190° C. at a shear rate of 100 sec$^{-1}$.

A raw sheet was formed by extruding the polyester (B2) by the same method as that employed in Example 7, and was then stretched and relaxed to produce a flat yarn of 1000 denier having a width of 3 m/m. The thus-produced flat yarn exhibited a tensile strength of 5.6 g/d, a knot strength of 3.5 g/d and significant toughness.

When the flat yarn obtained was buried in the ground for 5 months, the flat yarn was degraded to a level having no practical strength.

Examples 5 to 6

A flat yarn was produced under the same conditions as employed in Example 4 except that the denier was changed.

When the flat yarn obtained was buried in the ground for 5 months, the results obtained were the same as those obtained in Example 4.

Example 7

A 700 L reactor was purged with nitrogen, then 145 kg of ethylene glycol, 251 kg of succinic acid and 4.1 kg of citric acid were charged in it. After the temperature was elevated under nitrogen stream, esterification by dehydration condensation was performed for 3.5 hr at 190°–210° C., and after ceasing nitrogen charge, for further 5.5 hr under reduced pressures of 20–2 mmHg. A sample collected had an acid value of 8.8 mg/g, a number-average molecular weight (Mn) of 6,800 and a weight-average molecular weight (Mw) of ]3,500. Subsequently, 20 g of tetraisopropoxy titanium, a catalyst, was added at normal pressures under nitrogen stream. The temperature was elevated to perform a deglycol-reaction at temperatures of 210°–220° C. under reduced pressures of 15–0.2 mmHg for 4.5 hr. A sample collected had a number-average molecular weight (Mn) of 33,400 and a weight-average molecular weight (Mw) of 137,000. The resulting polyester (A3) had a yield of 323 kg except condensate water.

3.23 kg of hexamethylene diisocyanate was added to the reactor containing 323 kg of polyester (A3) to perform a coupling reaction for 1 hr at 180°–200° C. The viscosity was rapidly increased, but no gelation occurred. Then, 1.62 kg of Irganox 1010 (Ciba-Geigy) as an antioxidant and 1.62 kg of calcium stearate as a lubricant were added, and the mixture was further stirred for 30 min. The resulting reaction product was extruded into water by an extruder, and cut by a cutter into pellets. The polyester (B3) obtained after drying in a vacuum at 90° C. for 6 hr had a yield of 300 kg.

The obtained polyester (B3) was a slightly ivory-like white, waxy crystal, and had a melting point of 96° C., a number-average molecular weight (Mn) of 54,000, a weight-average molecular weight (Mw) of 324,000, a MFR (190° C.) of 1.1 g/10 min, a viscosity of 96 poises in a 10% orthochlorophenol solution and a melt viscosity of $1.6 \times 10^4$ poises at a temperature of 190° C. at a shear rate of 100 sec$^{-1}$.

A flat yarn was produced using the polyester (B3) under the same conditions as employed in Example 1. The thus-obtained flat yarn exhibited a knot strength of 3.5 g/d, a tensile strength of 5.5 g/d and significant toughness.

When the flat yarn was buried in the ground for 5 months, the flat yarn was degraded to a state having no practical physical properties.

Example 8

A 700 L reactor was purged with nitrogen, then 200 kg of 1,4-butanediol, 250 kg of succinic acid and 2.8 kg of trimethylol propane were charged in it. After the temperature was elevated under nitrogen stream, esterification by dehydration condensation was performed for 4.5 hr at 192°–220° C., and after ceasing nitrogen charge, for further 5.5 hr under reduced pressures of 20–2 mmHg. A sample collected had an acid value of 10.4 mg/g, a number-average molecular weight (Mn) of 4,900 and a weight average molecular weight (Mw) of 10,000. Subsequently, 37 g of tetraisopropoxy titanium, a catalyst, was added at normal pressures under nitrogen stream. The temperature was elevated to perform a deglycol-reaction at temperatures of 210°–220° C. under reduced pressures of 15–1.0 mmHg for 8 hr. A sample collected had a number-average molecular weight (Mn) of 16,900 and a weight-average molecular weight (Mw) of 90,300. The resulting polyester (A4) had a yield of 367 kg except condensate water of 76 kg.

3.67 kg of hexamethylene diisocyanate was added to the reactor containing 367 kg of polyester (A4) to perform a coupling reaction for 1 hr at 160°-200° C. The viscosity was rapidly increased, but no gelation occurred. Then, 367 g of Irganox 1010 (Ciba-Geigy) as an antioxidant and 367 g of calcium stearate as a lubricant were added, and the mixture was further stirred for 30 min. The resulting reaction product was extruded into water by an extruder, and cut by a cutter into pellets. The polyester (B4) obtained after drying in a vacuum at 90° C. for 6 hr had a yield of 350 kg.

The obtained polyester (B4) was a slightly ivory-like white, waxy crystal, and had a melting point of 110° C., a number-average molecular weight (Mn) of 17,900 a weight-average molecular weight (Mw) of 161,500 (Mw/Mn=9.0), a MFR (190° C.) of 0.21 g/10 min and a melt viscosity of $2.0 \times 10^4$ poises at a temperature of 180° C. at a shear rate of 100 sec $^{-1}$. The average molecular weight was measured in the same manner as in Example 1.

After the polyester (B4) was dried by a dew-point control type of hot air circulating dryer at 120° C. for 2 hours, the polyester was melted and extruded through a 90 mm$\phi$ extruder with a T-die having a die width of 1200 m/m and a lip gap of 0.7 m/m, and was hardened by cooling with a water-cooled chill roll to form a raw sheet. The thus-formed raw sheet was slit into widths of 7 m/m, stretched in two steps using a heating plate and was subjected to relaxation heat treatment using a heating plate. Stretching was performed in the first and second steps with a stretch ratio of 80 % and 20 respectively, of the total ratio of 4.5 times, at temperatures of 70° C. and 90° C., respectively. The relaxation temperature was 110° C., the relaxation rate was 10%, and the stretching speed was 80 m/min. As a result, a flat yarn of 950 denier having a width of 3 m/m was produced. The flat yarn obtained exhibited physical properties such as a tensile strength of 5.0 g/d and a knot strength of 2.5 g/d and sufficient for practical use.

When the flat yarns were buried in the ground for 5 months, about half of the yarns were degraded.

Comparative Example 1

The condition of the extrusion temperature of 180° C. in Example 1 was changed. The motor ampere value abruptly increased, and after a while, toughening and surging occurred in the raw sheet formed. Although the raw sheet was slit and stretched, the sheet frequently cut during stretching, and the process was stopped.

Comparative Example 2

The total stretch ratio in Example 1 was changed to 3 times. Although non-stretching occurs, stretching can be carried out. However, the flat yarn obtained had poor winding appearance.

Comparative Example 3

Although the polyester (A1) was molded under the same conditions as those employed in Example 1, the yarn cut in the course of stretching. Thus the objective flat yarn could not be obtained.

Comparative Example 4

A sheet was stretched only in a bath under the same conditions as employed in Example 1. The total stretch ratio was 4.5 times, and the temperature was increased by 10° to 80° C. The neck point was moved to a place behind the bath, and the yarn was not uniformly stretched. The yarn exhibited a tensile strength of 2.8 g/d, and a knot strength of 1.5 g/d.

Weaving Example

A cloth was formed by using the flat yarn produced in each of Examples 1, 2, 3, 4, 5, 8 and Comparative Example 4 through a 110-inch Sulzer type weaving loom with 12 warp×12 weft per inch. The results of measuring the tensile strength and the deterioration rate of the cloth obtained are shown in Table 2.

The tensile strength was measured in accordance with JIS L1068.

The deterioration rate of the cloth was calculated by the following equation:

$$\text{Deterioration rate} = \left(1 - \frac{\text{tensile strength of cloth}}{\text{flat yarn strength} \times \text{thread count}}\right) \times 100 \quad \text{[Equation 1]}$$

Example 9

The polyester (B1) obtained by Example 1 was extruded through a circular die at a molding temperature of 200° C. to form a film, and the resultant film was then slit into width of 15 mm, stretched by 6 times by a hot plate stretching machine and then split by a needle blade roll to produce split yarns of 1000 denier. The thus-produced split yarns were then twisted 50 turns per meter to produce a twisted yarn. Measurement of the tensile strength of the twisted yarn showed a value of 5 . 6 g/d.

When the twisted yarn was buried in the ground for 5 months, the strength of the twisted yarn degraded to a level with substantially no practicability.

Example 10

A twisted yarn was produced under the same conditions as those in Example 9 except that the polyester (B1) was stretched at 80° C. Measurement of the tensile strength of the resultant twisted yarn showed a value of 5.0 g/d. When a split yarn for the twisted yarn was buried in the ground for 5 months, the strength of the split yarn was decreased to a level without no practicability, and the occurrence of degradation was observed.

Example 11

A twisted yarn was produced under the same conditions as in Example 9 except that the polyester (B1) was formed into a film at 220° C. Measurement of the tensile strength of the resultant twisted yarn showed a value of 5.2 g/d. When a split yarn for the twisted yarn was buried in the ground for 5 months, the same results as those obtained in Example 1 were obtained.

Example 12

The polyester (B2) obtained by Example 4 was extruded through a circular die at a molding temperature of 190° C. to form a film, and the resultant film was then slit into widths of 15 mm, stretched by 6 times by a hot plate stretching machine, and split by a needle blade roll to produce split yarns of 1000 denier. The split yarns were then twisted 50 turns per meter to produce a twisted yarn. Measurement of the tensile strength of the twisted yarn showed a value of 5.8 g/d. When the split yarns for the twisted yarn were buried in the ground for 5 months, the yarns degraded to a state with a very low tensile strength.

Example 13

A twisted yarn was produced using the polyester (B3) obtained by Example 7 under the same conditions as employed in Example 12. Measurement of the tensile strength of the resultant twisted yarn showed a value of 6.0 g/d.

When the twisted yarn was buried in the ground for 5 months, the same results those obtained in Example I were obtained.

Example 14

The polyester (B4) obtained by Example 8 was extruded through a circular die at a molding temperature of 200° C. to form a film, and the resultant film was then slit into widths of 15 mm, stretched by 6 times at 70° C. by a hot plate stretching machine and is split by a needle blade roll to produce split yarns of 1000 denier. The thus-produced split yarns were then twisted 50 turns per meter to produce a twisted yarn. Measurement of the tensile strength of the twisted yarn showed a value of 5.3 g/d.

Comparative Example 5

An attempt was made to extrude the polyester (A1) through a circular die at a temperature of 200° C. to form a film. However, the bubble was deformed during film formation, and thus a film could not be stably formed.

TABLE 1

| | Die temperature (°C.) | Total stretch ratio (times) | Stretching temperature (°C.) first | Stretching temperature (°C.) second | Heat treatment relaxation rate (%) | Heat treatment temperature (°C.) |
|---|---|---|---|---|---|---|
| Example | | | | | | |
| 1 | 210 | 5.0 | 70 | 90 | 10 | 120 |
| 2 | 210 | 5.0 | 70 | 90 | 10 | 120 |
| 3 | 210 | 5.0 | 70 | 90 | 10 | 120 |
| 4 | 210 | 5.0 | 70 | 90 | 10 | 120 |
| 5 | 210 | 5.0 | 70 | 90 | 10 | 120 |
| 6 | 210 | 5.0 | 70 | 90 | 10 | 120 |
| 7 | 210 | 5.0 | 70 | 90 | 10 | 120 |
| 8 | 210 | 4.5 | 80 | 90 | 10 | 120 |
| Comparative Example | | | | | | |
| 1 | 180 | 5.0 | 70 | 90 | 10 | 120 |
| 2 | 210 | 5.0 | 70 | 90 | 10 | 120 |
| 3 | 210 | 5.0 | 70 | 90 | 10 | 120 |
| 4 | 210 | 4.5 | 80 | — | 10 | 120 |

| | Physical properties of flat yarn | | | | |
|---|---|---|---|---|---|
| | Width (m/m) | Denier (d) | Tensile strength (g/d) | Knot strength (g/d) | Evaluation Appearance |
| Example | | | | | |
| 1 | 3 | 1000 | 5.3 | 3.0 | good |
| 2 | 3 | 1200 | 5.1 | 2.8 | good |
| 3 | 8 | 1600 | 4.8 | 2.6 | good |
| 4 | 3 | 1000 | 5.6 | 3.5 | good |
| 5 | 3 | 1200 | 5.3 | 3.2 | good |
| 6 | 8 | 1600 | 5.1 | 3.1 | good |
| 7 | 3 | 1000 | 5.8 | 3.6 | good |
| 8 | 3 | 950 | 5.0 | 2.5 | good |
| Comparative Example | | | | | |
| 1 | 3 | 1000 | — | — | poor stretching |
| 2 | 3 | 1000 | 3.1 | 1.4 | unstretching, unstable winding |
| 3 | 3 | 1000 | — | — | frequent cut in stretching |
| 4 | 3 | 1000 | 2.8 | 1.5 | many uneven stretching, unstable winding |

TABLE 2

| Specimen Flat yarn | Tensile Strength (kg/50 mm) | | Deterioration Rate (%) | |
|---|---|---|---|---|
| | Longitudinal | Lateral | Longitudinal | Lateral |
| Example | | | | |
| 1 | 59.1 | 54.6 | 7 | 14 |
| 2 | 57.5 | 54.4 | 6 | 11 |
| 3 | 52.4 | 47.2 | 9 | 18 |
| 4 | 62.4 | 57.7 | 7 | 14 |
| 5 | 65.4 | 61.9 | 6 | 11 |
| 8 | 58.8 | 52.2 | 8 | 13 |
| Comparative Example | | | | |
| 4 | 29.5 | 26.8 | 15 | 22 |

What is claimed is:

1. A polyester flat and split yarn comprising an aliphatic polyester having a melt viscosity of $2.0 \times 10^3 - 4.0 \times 10^4$ poises at a temperature of 190° C. and a shear rate of 100 sec$^{-1}$ and having a melting point of 70°–190° C.,
   wherein said aliphatic polyester is obtained from ingredients consisting essentially of diisocyanate and a prepolymer in a molten state by adding from 0.1 to 5 parts by weight of diisocyanate to 100 parts by weight of a prepolymer in a molten state,
   wherein said prepolymer
   is obtained from a reaction of at least an aliphatic glycol and an aliphatic dicarboxylic acid, wherein the reaction includes (a) succinic acid, or its anhydride, reacted with 1,4-butanediol, (b) succinic acid, adipic acid, or their anhydride, reacted with 1,4-butanediol, or (c) succinic acid, or its anhydride, reacted with ethylene glycol, and
   has a number-average molecular weight of at least 10,000.

2. The flat and split yarn as claimed in claim 1 wherein the aliphatic polyester has a repeated chain structure in which a polyester prepolymer having a number-average molecular weight (Mn) of 10,000 or more and obtained by reacting an aliphatic glycol, aliphatic dicarboxylic acid and, as the third component, at least one polyfunctional component selected from the group consisting of trifunctional or tetrafunctional polyols, oxycarboxylic acids and polybasic carboxylic acids or acid anhydrides thereof, is combined through urethane bonds.

3. The flat and split yarn as claimed in claim 2 wherein the polyester prepolymer contains one or more compounds selected from the group consisting of trimethylol propane, glycerin and pentaerythritol as the trifunctional or tetrafunctional polyol of the third component.

4. The flat and split yarn as claimed in claim 2 wherein the polyester prepolymer contains one or more compounds selected from the group consisting of malic acid, citric acid and tartaric acid as the trifunctional or tetrafunctional oxycarboxylic acid of the third component.

5. The flat and split yarn as claimed in claim 2 wherein the polyester prepolymer contains one or more compounds selected from the group consisting of trimesic acid, propane tricarboxylic acid, trimellitic anhydride, pyromellitic anhydride, benzophenone tetracarboxylic anhydride and cyclopentane tetracarboxylic anhydride as the trifunctional or tetrafunctional polybasic carboxylic acid of the third component.

6. A method for producing flat yarn comprising:
melt extruding as a main component an aliphatic polyester having a melt viscosity of $2.0 \times 10^3 - 4.0 \times 10^4$ poises at a temperature of 190° C. and shear rate of 100 $sec^{-1}$, and having a melting point of 70°-190° C,
wherein said aliphatic polyester is obtained from ingredients consisting essentially of diisocyanate and a prepolymer in a molten state by adding from 0.1 to 5 parts by weight of diisocyanate to 100 parts by weight of a prepolymer in a molten state,
wherein said prepolymer
is obtained from a reaction of at least an aliphatic glycol and an aliphatic dicarboxylic acid, wherein the reaction includes (a) succinic acid, or its anhydride, reacted with 1,4-butanediol, (b) succinic acid, adipic acid, or their anhydride, reacted with 1,4-butanediol, or (c) succinic acid, or its anhydride, reacted with ethylene glycol, and
has a number-average molecular weight of at least 10,000,
to form a film; then
stretching the film.

7. A method for producing flat yarn comprising:
melt extruding as a main component an aliphatic polyester having a melt viscosity of $2.0 \times 10^3 - 4.0 \times 10^4$ poises at a temperature of 190° C. and a shear rate of 100 $sec^{-1}$, and having a melting point of 70°-190° C.,
wherein said aliphatic polyester is obtained from ingredients consisting essentially of diisocyanate and a prepolymer in a molten state by adding from 0.1 to 5 parts by weight of diisocyanate to 100 parts by weight of a prepolymer in a molten state,
wherein said prepolymer
is obtained from a reaction of at least an aliphatic glycol and an aliphatic dicarboxylic acid, wherein the reaction includes (a) succinic acid, or its anhydride, reacted with 1,4-butanediol, (b) succinic acid, adipic acid, or their anhydride, reacted with 1,4-butanediol, or (c) succinic acid, or its anhydride, reacted with ethylene glycol, and
has a number-average molecular weight of at least 10,000,
to form a film;
stretching the film; then
splitting the stretched film.

* * * * *